US009234605B2

(12) United States Patent
Sung

(10) Patent No.: US 9,234,605 B2
(45) Date of Patent: Jan. 12, 2016

(54) CONSTANT PRESSURE VALVE

(71) Applicant: WINNER HYDRAULICS CORPORATION, Chang-Hua County (TW)

(72) Inventor: Wu-Long Sung, Chang-Hua County (TW)

(73) Assignee: WINNER HYDRAULICS CORPORATION, Hua-Tan Hsiang (TW)

( * ) Notice: Subject to any disclaimer, the term of this patent is extended or adjusted under 35 U.S.C. 154(b) by 292 days.

(21) Appl. No.: 14/085,873

(22) Filed: Nov. 21, 2013

(65) Prior Publication Data
US 2015/0000774 A1    Jan. 1, 2015

(30) Foreign Application Priority Data

Jul. 1, 2013   (TW) .............................. 102123511 A

(51) Int. Cl.
*F16K 31/06*       (2006.01)
*F16K 11/07*       (2006.01)
*F16K 27/02*       (2006.01)
*G05D 16/20*       (2006.01)

(52) U.S. Cl.
CPC ......... *F16K 31/0613* (2013.01); *F16K 11/0708* (2013.01); *F16K 27/029* (2013.01); *G05D 16/2013* (2013.01); *Y10T 137/86485* (2015.04)

(58) Field of Classification Search
CPC .............. F16K 31/0613; F16K 27/029; F16K 11/0708; G05D 16/2013; Y10T 137/86485
USPC ............. 137/625.65, 625.68, 625.25, 625.67, 137/624.27
See application file for complete search history.

(56) References Cited

U.S. PATENT DOCUMENTS

| | | | | |
|---|---|---|---|---|
| 3,079,947 A | * | 3/1963 | Hunt .................... | F16K 31/0613 137/545 |
| 8,118,060 B2 | * | 2/2012 | Stallmann ............ | F16K 11/0716 137/625.68 |
| 8,186,378 B2 | * | 5/2012 | Nordstrom .......... | F16K 31/0613 137/550 |
| 8,251,096 B2 | * | 8/2012 | Schiel ................. | F16K 11/0712 137/625.68 |
| 2012/0048398 A1 | * | 3/2012 | Schudt ................ | F16K 31/0613 137/514 |

\* cited by examiner

*Primary Examiner* — Craig Schneider
*Assistant Examiner* — Josephine Trinidad-Borges
(74) *Attorney, Agent, or Firm* — Nixon & Vanderhye P.C.

(57) ABSTRACT

A constant pressure valve includes a lock rod, a valve sleeve, a sliding shaft, a biasing unit, and a solenoid unit. The lock rod is formed with a first through hole. The valve sleeve is inserted fixedly into the lock rod, and includes an outer sleeve surface having a shrunk surface portion cooperating with the lock rod to define an annular space in fluid communication with the first through hole. The sliding shaft is movable in the valve sleeve to contact the lock rod, and includes a large-diameter section and a small-diameter section. The constant pressure valve is adapted to maintain a hydraulic device at a preset pressure. The less a difference between the diameters of the large-diameter section and the small-diameter section is, the more the preset pressure can be.

5 Claims, 15 Drawing Sheets

CONSTANT PRESSURE VALVE

CROSS-REFERENCE TO RELATED APPLICATION

This application claims priority of Taiwanese Application No. 102123511, filed on Jul. 1, 2013.

BACKGROUND OF THE INVENTION

1. Field of the Invention

This invention relates to a valve, and more particularly to a constant pressure valve.

2. Description of the Related Art

Referring to FIG. 1, a conventional constant pressure valve 10 is mounted into a manifold block 20. The manifold block 20 has a mounting hole 21 extending therethrough along an axial direction (X), a pressure-reducing port 22 connected fluidly to a workpiece (not shown), such as a hydraulic cylinder and a hydraulic motor, a fluid inlet 23 connected fluidly to a fluid supplying tank (not shown), and a pressure relief port 24 connected fluidly to a return fluid tank (not shown). The pressure-reducing port 22, the fluid inlet 23, and the pressure relief port 24 are in fluid communication with the mounting hole 21. In operation, fluid is fed through the fluid inlet 23 to flow into the pressure-reducing port 22 through the constant pressure valve 10. When the fluid pressure in the pressure-reducing port 22 exceeds a preset pressure, the fluid flows out through the pressure relief port 24 to maintain the pressure-reducing port 22 at the preset pressure, thereby facilitating steady operation of the workpiece.

With additional reference to FIGS. 2 and 3, the constant pressure valve 10 includes a lock rod 11 threaded into the mounting hole 21 in the manifold block 20, an inner fixed seat 12 secured in the lock rod 11, a valve sleeve 13 inserted fixedly into the lock rod 11 along the axial direction (X) and abutting against the inner fixed seat 12, a sliding shaft 14 movable axially in the valve sleeve 13, an outer fixed seat 15 secured in the valve sleeve 13 and in fluid communication with the pressure-reducing port 22, a compression spring 16 disposed between the sliding shaft 14 and the outer fixed seat 15, and a solenoid unit 17 threaded to the lock rod 11 along the axial direction (X).

The lock rod 11 has a first radial through hole 111 aligned with the pressure-reducing port 24, and a first inclined hole 112 in fluid communication with the pressure relief port 24.

The valve sleeve 13 has an inner end portion 131 disposed in the lock rod 11 and cooperating with the lock rod 11 to define an annular space 18 in fluid communication with the first radial through hole 111, an outer end portion 132 opposite to the inner end portion 131 and exposed from the lock rod 11, a second radial through hole 133 formed in the outer end portion 132 and in fluid communication with the fluid inlet 23, and a third radial through hole 134 formed in the inner end portion 131 and in fluid communication with the annular space 18.

The sliding shaft 14 has a large-diameter shaft section 140, an axially extending blind hole 141, a shoulder portion 142 defining an end of the blind hole 141, a small-diameter shaft section 143 extending from the shoulder portion 142 and through the inner fixed seat 12, fourth and fifth radial through holes 144, 145 disposed between the second radial through hole 133 and the third radial through hole 134, and a second inclined hole 146 extending through the shoulder portion 142. The outer diameter of the large-diameter shaft section is (D). The outer diameter of the small-diameter shaft section is (d).

The shoulder portion 142 of the sliding shaft 14 cooperates with the inner end portion 131 of the valve sleeve 13 and the inner fixed seat 12 to define a fluid storage space 19. The second inclined hole 146 is in fluid communication with the inner receiving chamber 141 and the fluid storage space 19.

The compression spring 16 biases the sliding shaft 14 to move rightwardly.

The solenoid unit 17 includes a fixed iron cylinder 171 threaded to the threaded section 313 of the lock rod 30, a movable iron rod 173 movable axially in an inner receiving chamber 172 in the fixed iron cylinder 171, and a coil member 174 disposed around the fixed iron cylinder 171. The movable iron rod 173 has a pushing rod section 175 movable to push the small-diameter shaft section 143 of the sliding shaft 14. The inner receiving chamber 172 in the fixed iron cylinder 171 is in fluid communication with the first inclined hole 112 in the lock rod 11.

When the coil member 174 is not energized, the input electrical current is 0 mA, a leftward pushing force applied by the pushing rod section 175 to the small-diameter shaft section 143 is 0 kg, and a rightward pushing force applied by the compression spring 16 to the sliding shaft 14 is k (elastic modulus)×L (pre-compressed length). In this state, the second radial through hole 133 of the valve sleeve 13 is misaligned from the fourth radial through hole 144 in the sliding shaft 14, so as to prevent fluid flow from the fluid inlet 23 into the sliding shaft 14. The third radial through hole 134 in the valve sleeve 13 cooperates with the fifth radial through hole 145 in the sliding shaft 14 to form a first opening 101 (see FIG. 2) therebetween. The fluid flows from the pressure-reducing port 22 into the inner receiving chamber 141 in the sliding shaft 14 via the compression spring 16, subsequently into the annular space 18 through the fifth radial through hole 145 and the third radial through hole 133, and eventually into the pressure-reducing port 24 and the return fluid tank through the first radial through hole 111 in the lock rod 11.

With particular reference to FIGS. 1 and 3, when an electrical current is input into the coil member 174, an electromagnetic force occurs between the fixed iron cylinder 171 and the movable iron rod 173 to provide a leftward pushing force to the small-diameter shaft section 143. As soon as the leftward pushing force is greater than the rightward pushing force applied by the compression spring 16 to the sliding shaft 14, the sliding shaft 14 is pushed by the movable iron shaft 173 to move leftwardly to thereby seal the first opening 101. At the same time, the fourth radial through hole 144 in the sliding shaft 14 is brought into fluid communication with the second radial through hole 133 in the valve sleeve 13 to form a second opening 102 therebetween. Hence, the fluid flows from the fluid inlet 23 into the inner receiving chamber 141 in the sliding shaft 14, and subsequently into the pressure-reducing port 22, the second inclined hole 146, and the fluid storage space 19, so that the fluid pressure in the pressure-reducing port 22 increases gradually, and is applied to the sliding rod 14. In accordance with Pascal's principle, all points in a sealed space have the same pressure. If the fluid pressure in the pressure-reducing port 22, the inner receiving chamber 141 in the sliding shaft 14, and the fluid storage space 19 is ($P_1$), a rightward pushing force applied by the fluid in the pressure-reducing port 22 to the sliding shaft 14 is $P_1 \times \pi D^2/4$, and a rightward pushing force applied by the fluid in the fluid storage space 19 to the sliding shaft 14 is $P_1 \times [\pi D^2/4 - \pi d^2/4]$. Thus, the net rightward pushing force is $P_1 \times \pi d^2/4$. Since the electromagnetic force of the constant pressure valve 10 is $F = k \times L + P_1 \times \pi d^2/4$, the pressure of the fluid in the pressure-reducing port 22 can be changed by adjusting the input electric current of the coil member 174. In addition, since the maximum value of the electromagnetic force F is fixed, to obtain a greater fluid pressure in the pressure-reducing port 22, it is necessary to reduce the outer diameter (d) of the small-diameter shaft section 143.

With particular reference to FIGS. 1 and 4, when fluid flows continuously from the fluid inlet 23 into the pressure-reducing port 22, the fluid pressure in the pressure-reducing port 22 increases. As soon as the rightward pushing force is greater than the leftward pushing force, the sliding shaft 14 is moved rightwardly. When the fluid pressure in the pressure-reducing port 22 increases, the first opening 101 (see FIG. 2) is still sealed, and the opening degree of the second opening 102 is reduced gradually. In accordance with Bernoulli's principle, the more quickly the fluid flows, the less the fluid pressure is. Hence, when the opening degree of the second opening 102 is reduced, the pressure drop between the fluid inlet 23 and the pressure-reducing port 22 is increased. Since the pressure in the fluid inlet 23 is fixed, the pressure ($P_1$) in the pressure-reducing port 22 is reduced to the preset pressure.

Subsequently, with particular reference to FIGS. 1 and 5, the pressure ($P_1$) in the pressure-reducing port 22 may exceed the preset pressure (even when the second opening 102 is closed) due to abnormal condition of the workpiece, e.g., a hydraulic cylinder is subjected to an external pushing force, or a hydraulic motor is subjected to a load. In this state, the sliding shaft 14 continues to move rightwardly until the first opening 101 is opened again. At this time, the fluid flows from the pressure-reducing port 22 into the pressure relief port 24 and the return fluid tank along a path including the first opening 101, the annular space 18, and the first radial hole 111. In this manner, the pressure ($P_1$) in the pressure-reducing port 22 can be returned to the preset pressure.

FIGS. 2, 3, and 4 illustrate the pressure reduction function of the constant pressure valve 10. FIG. 5 illustrates the pressure relief function of the constant pressure valve 10. These two functions of the constant pressure valve 10 enable the pressure ($P_1$) in the pressure-reducing port 22 to be maintained at the preset pressure. As described above, however, to obtain a greater fluid pressure of the pressure-reducing port 22, the outer diameter of the small-diameter shaft section 143 needs to be reduced. As a result, the strength of the small-diameter shaft section 143 is low, and thus is easy to deform or break when the small-diameter shaft section 143 is subjected to a high pressure.

SUMMARY OF THE INVENTION

The object of this invention is to provide a constant pressure valve that includes a high-strength sliding shaft.

According to this invention, a constant pressure valve includes a lock rod, a valve sleeve, a sliding shaft, a biasing unit, and a solenoid unit. The lock rod is formed with a first through hole. The valve sleeve is inserted fixedly into the lock rod, and includes an outer sleeve surface having a shrunk surface portion cooperating with the lock rod to define an annular space in fluid communication with the first through hole. The sliding shaft is movable in the valve sleeve to contact the lock rod, and includes a large-diameter section and a small-diameter section. The constant pressure valve is adapted to maintain a hydraulic device at a preset pressure. The less a difference between the diameters of the large-diameter section and the small-diameter section is, the more the preset pressure can be, so that the strength of the sliding shaft can be increased.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
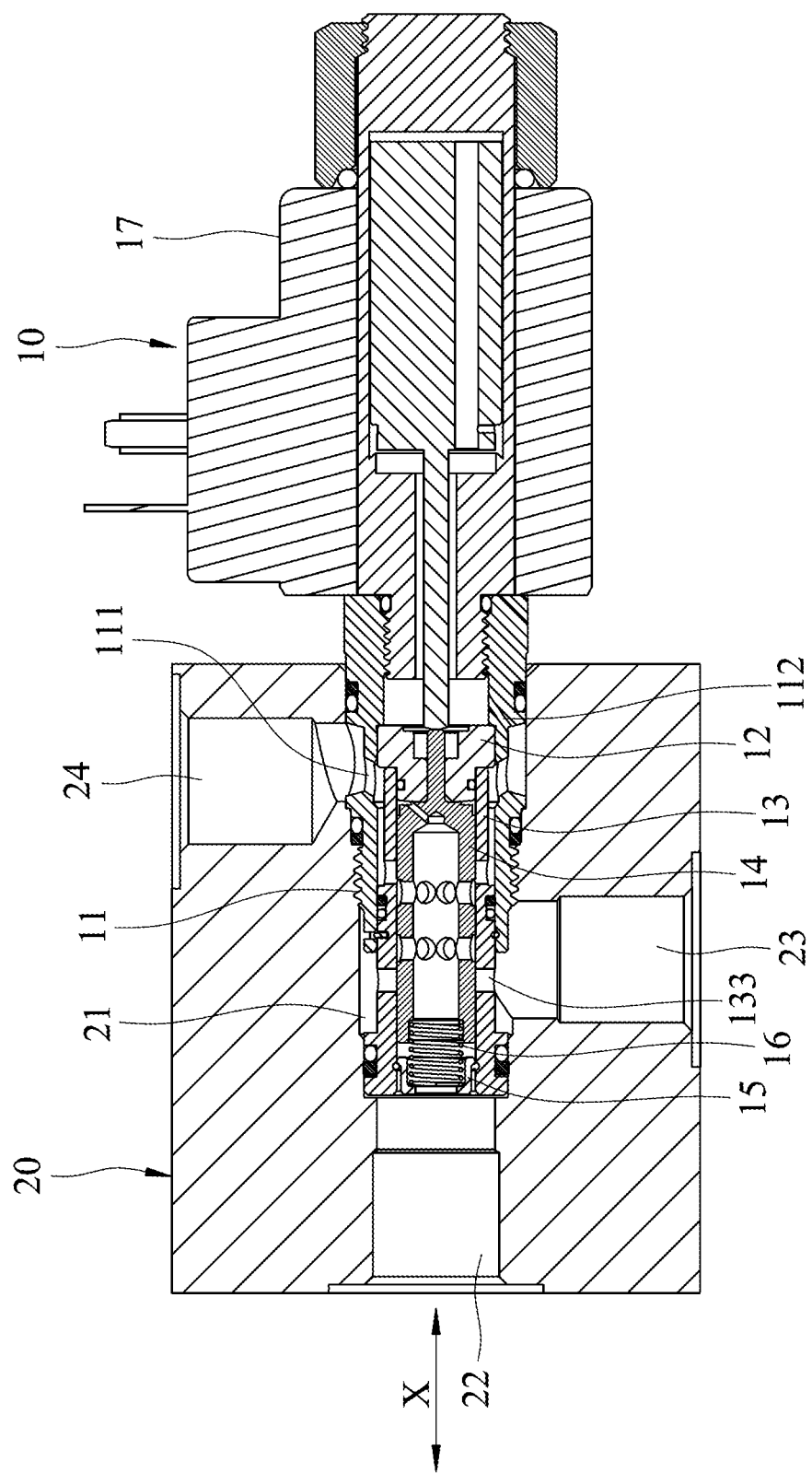
FIG. 1 is a sectional view of a conventional conventional constant pressure valve and a manifold block.
Figure 2:
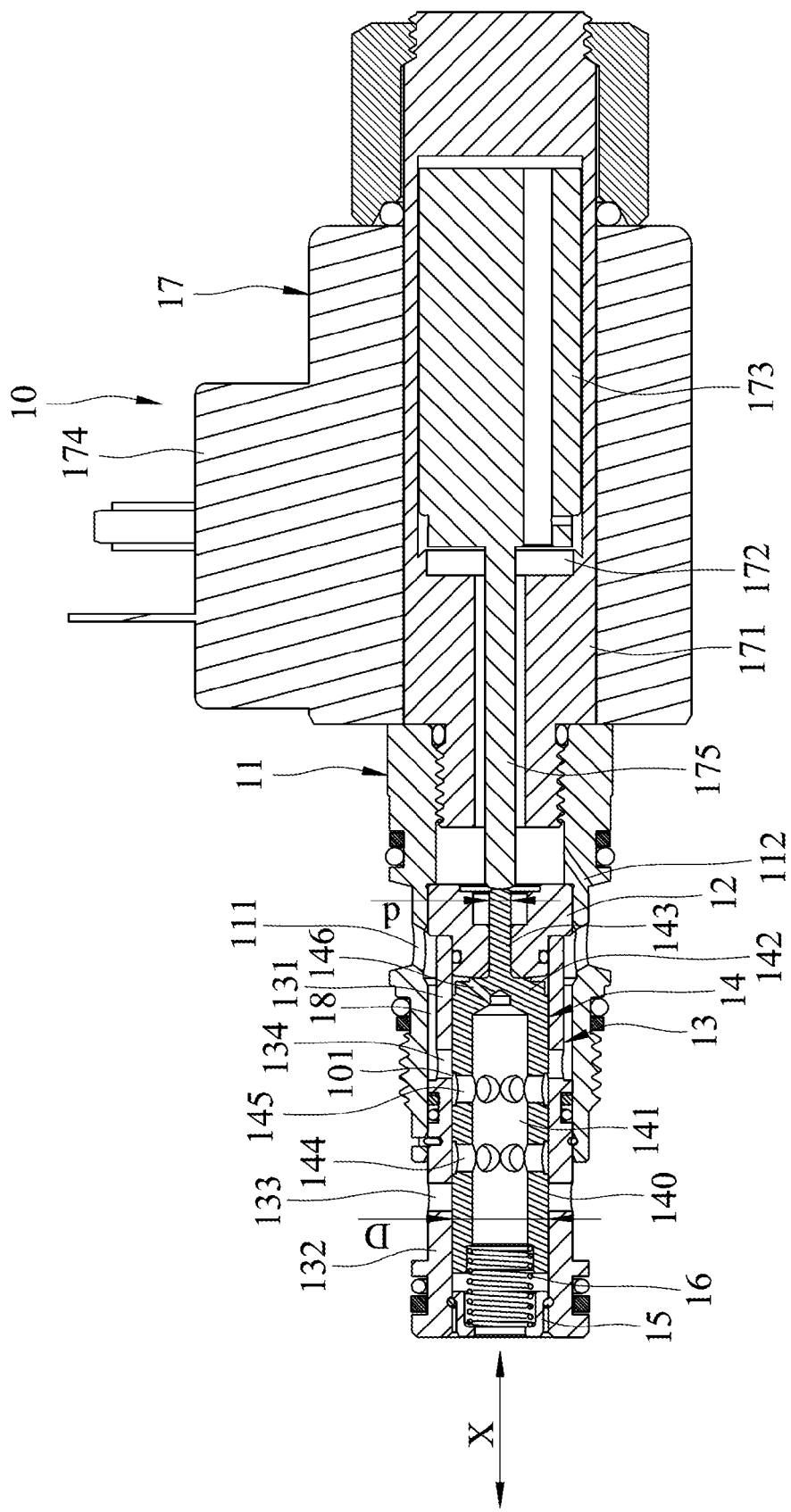
FIGS. 2, 3, and 4 are sectional views illustrating the pressure reduction function of the conventional constant pressure valve.
Figure 3:
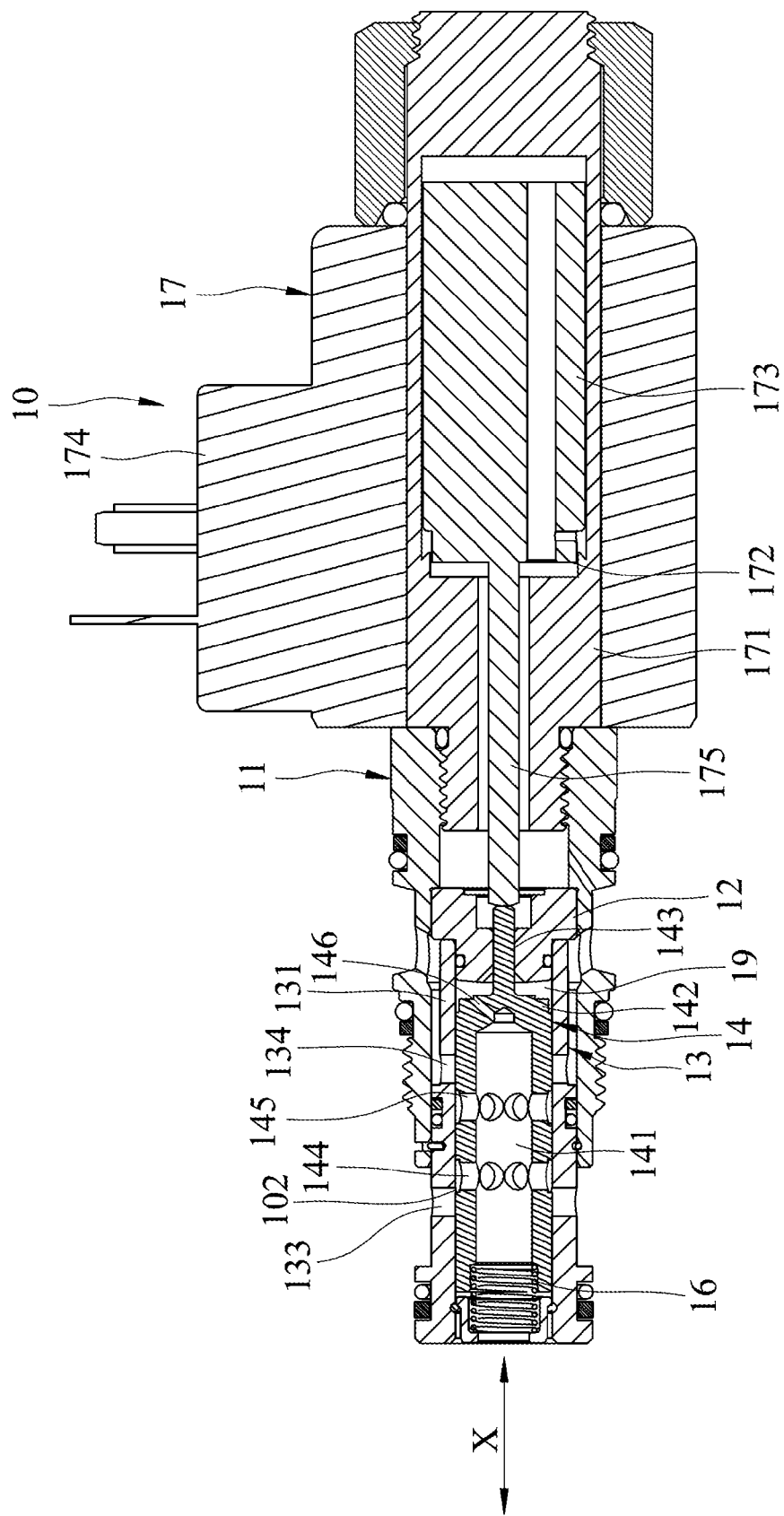
Figure 4:
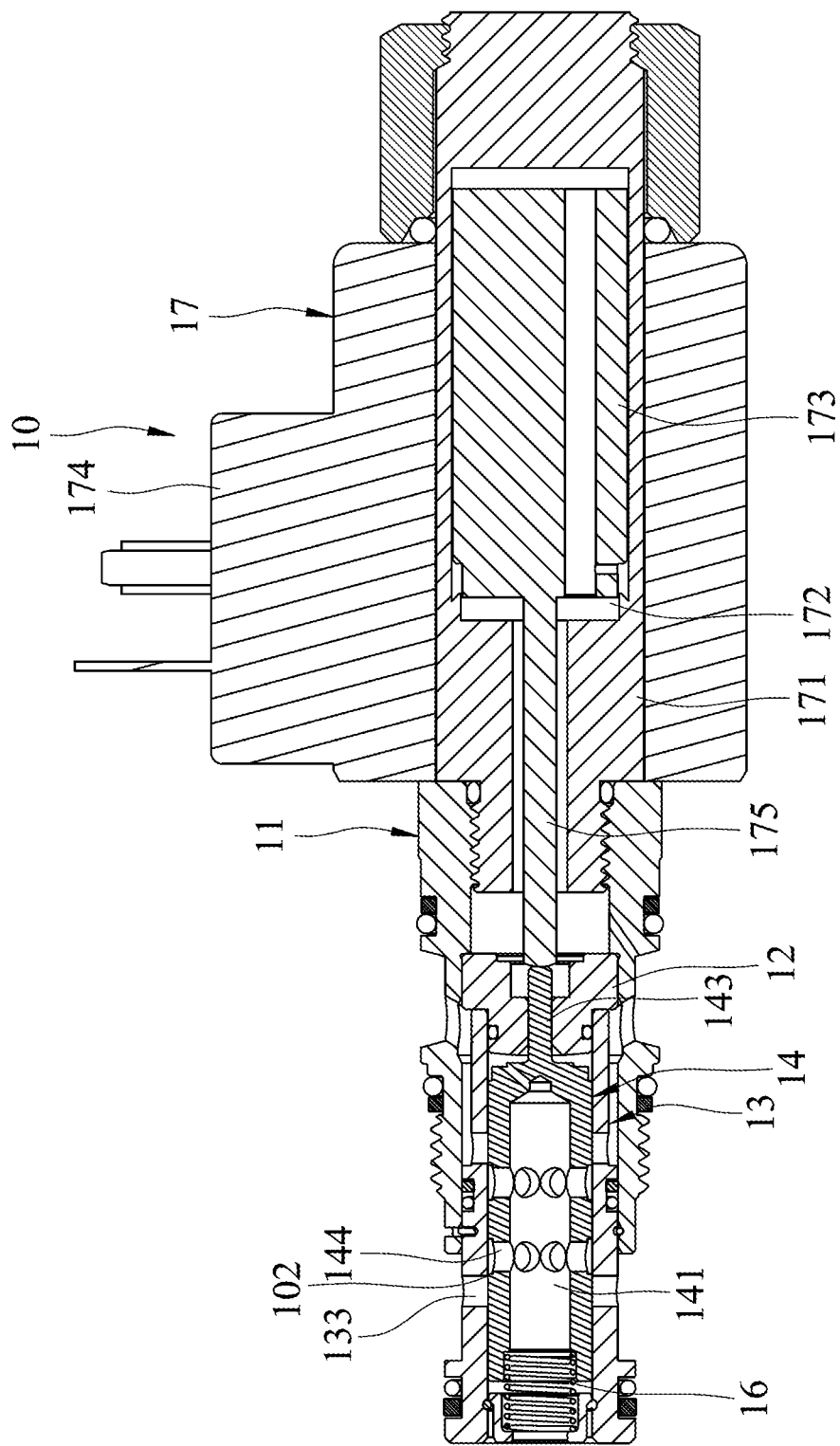
Figure 5:
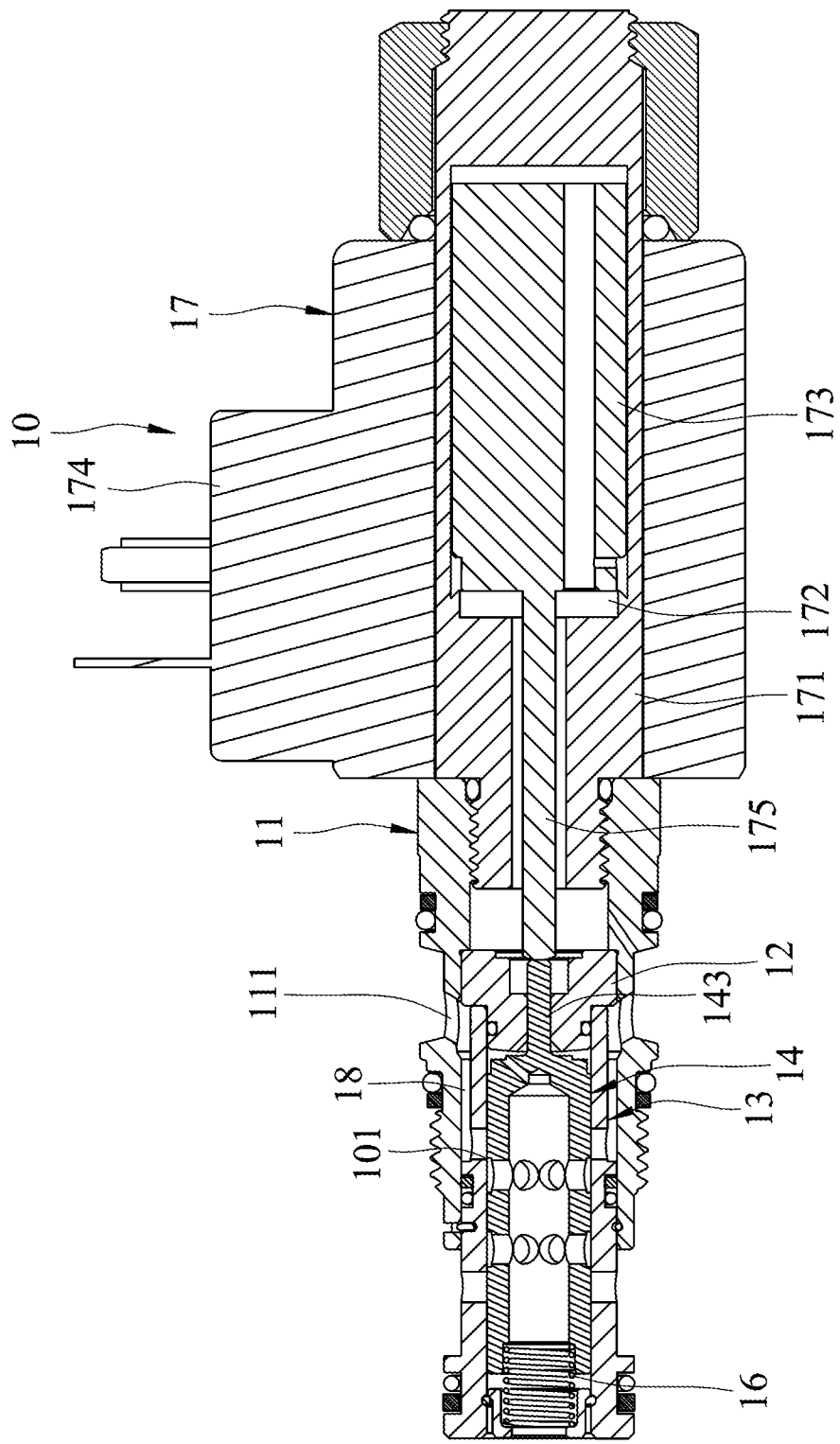
FIG. 5 is a sectional view illustrating the pressure relief function of the conventional constant pressure valve.
Figure 6:
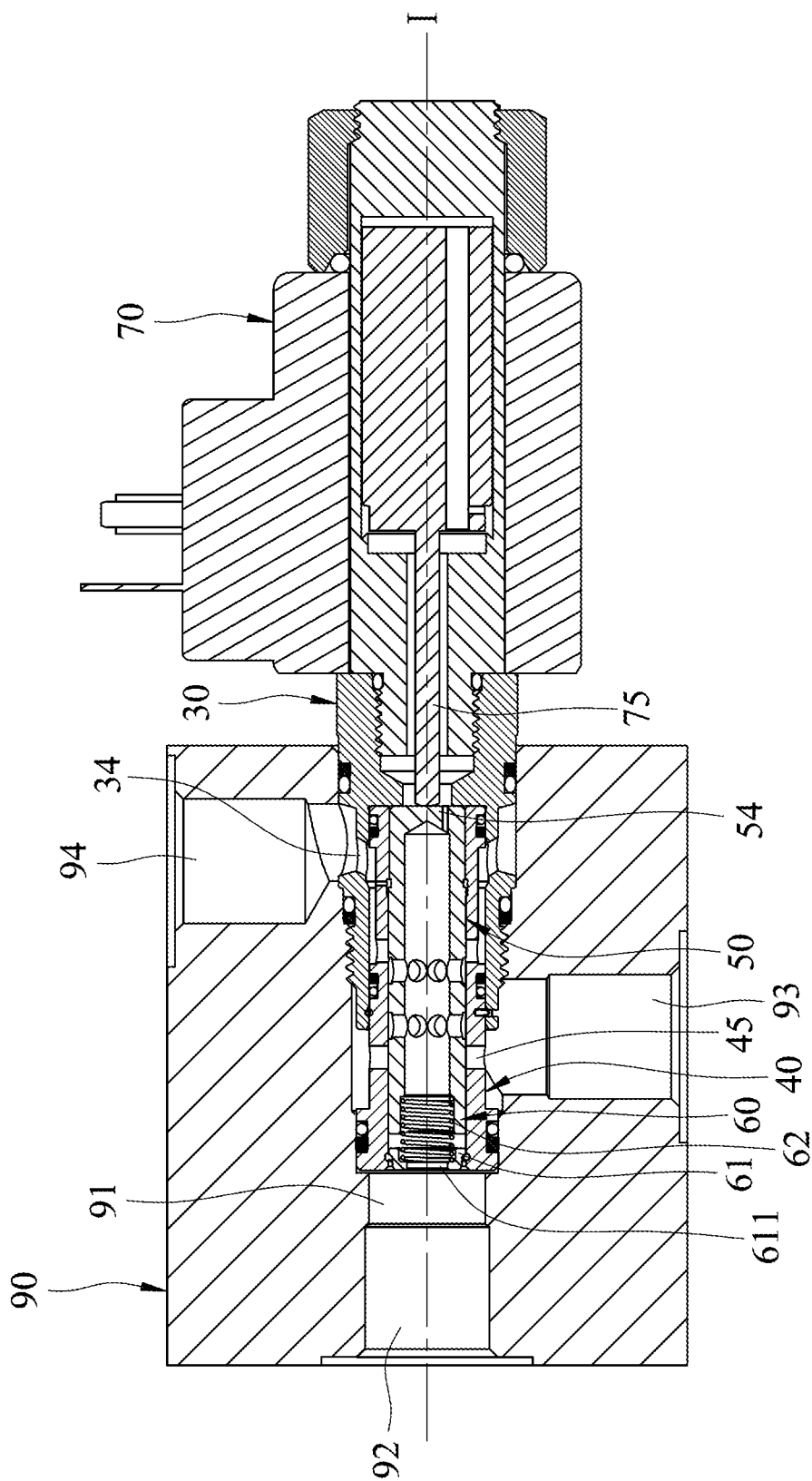
FIG. 6 is a sectional view of the preferred embodiment of a constant pressure valve according to this invention, illustrating how the constant pressure valve is mounted to a manifold block.
Figure 7:
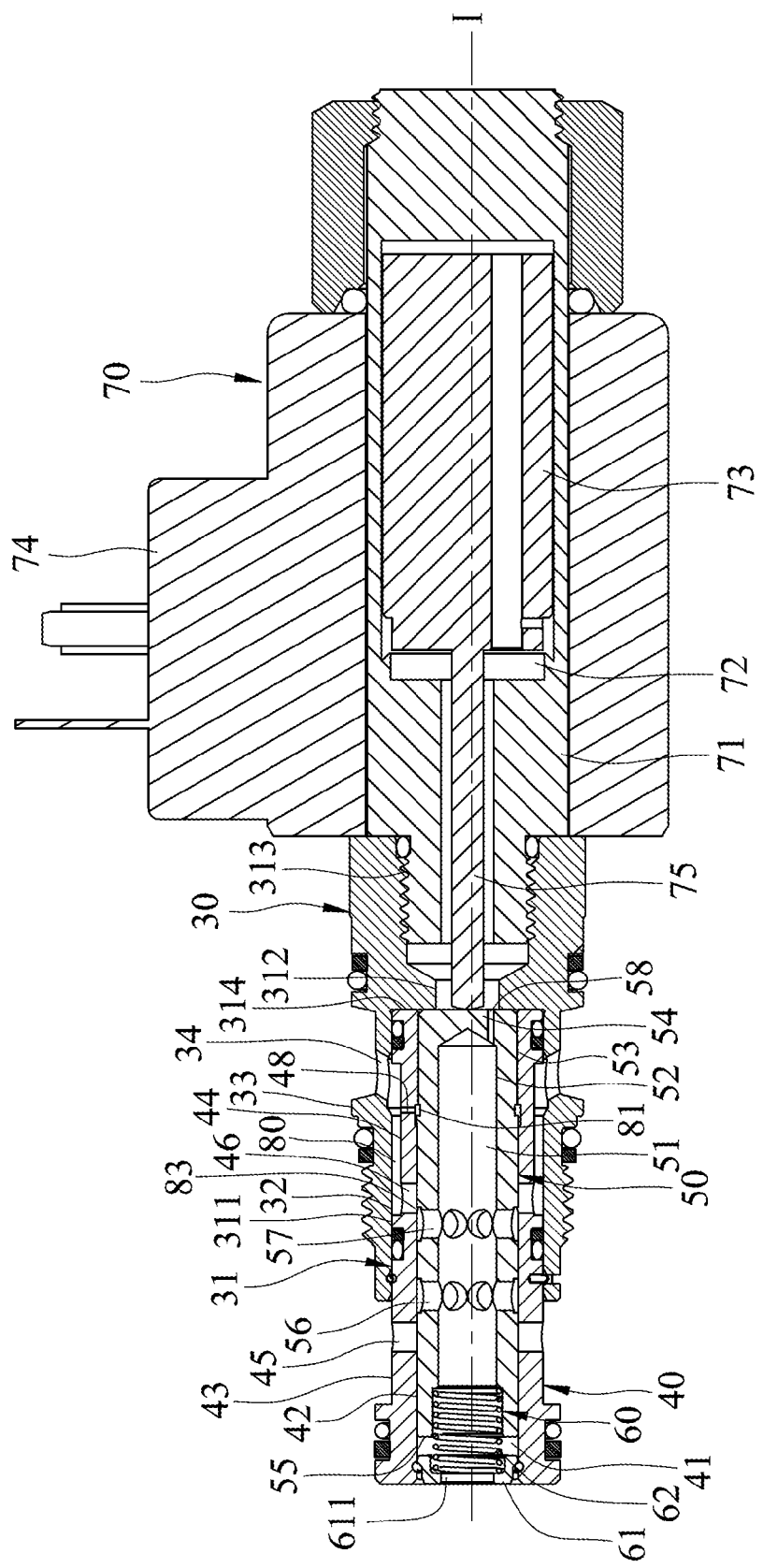
FIG. 7 is a sectional view of the preferred embodiment, illustrating that the constant pressure valve is in a first pressure reduction state.
Figure 8:
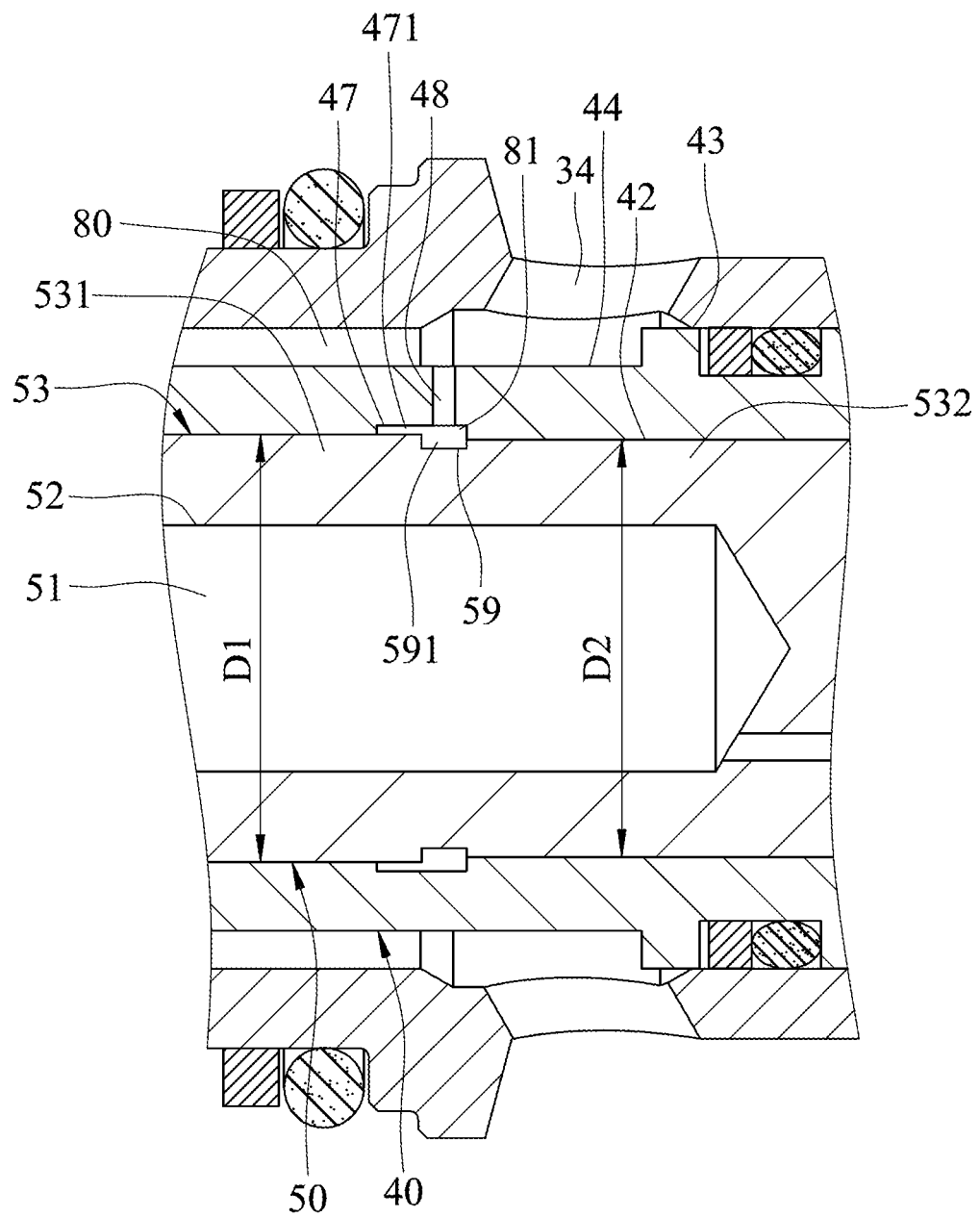
FIG. 8 is a fragmentary sectional view of the preferred embodiment, illustrating that the outer diameter of a large-diameter section of an outer shaft surface is greater than that of a small-diameter section of the outer shaft surface.

Referring to FIGS. 6, 7, and 8, the preferred embodiment of a constant pressure valve according to this invention includes a lock rod 30, a valve sleeve 40, a sliding shaft 50, a biasing unit 60, and a solenoid unit 70. The lock rod 30 is threaded to a manifold block 90.

The manifold block 90 has a mounting hole 91 formed therethrough along an axis (I), a pressure-reducing port 92 extending along the axis (I) and in fluid communication with the mounting hole 91, and a fluid inlet 93, and a pressure relief port 94. The fluid inlet 93 and the pressure relief port 94 extend along a radial direction, and is in fluid communication with the mounting hole 91. The pressure-reducing port 92, the fluid inlet 93, and the pressure relief port 94 are connected respectively and fluidly to a workpiece (such as a hydraulic cylinder or a hydraulic motor), a fluid feeding tank, and a return fluid tank that are not shown).

The lock rod 30 includes an inner hole 31 centered at the axis (I), an inner rod surface 32 defining the inner hole 31, an outer rod surface 33 disposed around the axis (I), and a first through hole 34 extending through the inner and outer rod surfaces 32, 33. The inner hole 31 has a thick section 311, a thin section 312, and a threaded section 313. The thin section 312 is connected between the thick section 311 and the threaded section 313. The lock rod 30 further includes a shoulder surface 314 disposed between the thick and thin sections 311, 312, and defines an end of the thick section 311. A plurality of seal rings are sleeved on the outer rod surface 33 for preventing leakage of fluid.

The valve sleeve 40 is fixed in the inner hole 31 in the lock rod 30, and extends along the axis (I), and includes an axial hole 41 centered at the axis (I), an inner sleeve surface 42 defining the axial hole 41 and having a first concaved surface portion 47 defining a first annular groove 471, an outer sleeve surface 43 disposed around the axis (I) and having a shrunk surface portion 44 that cooperates with the inner rod surface 32 to define an annular space 80 therebetween, a second through hole 45 extending through the inner and outer sleeve surfaces 42, 43 and disposed outwardly of the lock rod 30, a third through hole 46 extending through the shrunk surface portion 44 of the outer sleeve surface 43 and the inner sleeve surface 42, and a fourth through hole 48 extending through the shrunk surface portion 44 of the outer sleeve surface 43 and the first concaved surface portion 471. The fourth through hole 48 and the annular space 80 are in fluid communication with the first through hole 34. A plurality of seal rings are sleeved on the outer sleeve surface 43 for preventing leakage of fluid.

The sliding shaft 50 is disposed movably within the axial hole 41 in the valve sleeve 40, and is movable along the axis (I) to contact the lock rod 30. The sliding rod 50 includes a first receiving chamber 51 centered at the axis (I), an inner shaft surface 52 defining the first receiving chamber 51, an outer shaft surface 53 disposed around the axis (I), an open end 55, a closed end opposite to the open end 55, an end wall 54 disposed at the closed end, fifth and sixth through holes 56, 57 extending through the inner and outer shaft surfaces 52, 53 and disposed between the second and third through holes 45, 46, and a seventh through hole 58 extending through the end wall 54 and in fluid communication with the first receiving chamber 51 and the small-diameter section 312 of the inner hole 31 in the lock rod 30.

The outer shaft surface 53 of the sliding shaft 50 has a large-diameter section 531 distal from the end wall 54, and a small-diameter section 532 proximate to the end wall 54. The outer diameter (D1) of the large-diameter section 531 is greater than the outer diameter (D2) of the small-diameter section 532. A portion of the outer shaft surface 53 disposed between the large-diameter section 531 and the small-diameter section 531 cooperates with the inner sleeve surface 42 to define a zero pressure space 81. Preferably, the outer shaft surface 53 further has a second concaved surface portion 59 defining a second annular groove 591. The first and second concaved surface portions 47, 59 cooperate to define the zero pressure space 81. In other words, the first and second annular grooves 471, 591 cooperate to constitute the zero pressure space 81.

The biasing unit 60 is disposed between the valve sleeve 40 and the sliding shaft 50 for biasing the sliding rod 50 toward the lock rod 30, and includes a fixed seat 61 fixed in the axial hole 41 in the valve sleeve 40 and having a hole 611 in fluid communication with the pressure-reducing port 92, and a resilient member 62 disposed between the fixed seat 61 and the sliding shaft 50 along the axis (I) for biasing the sliding shaft 50 away from the fixed seat 61 to push the sliding shaft 50 rightwardly. In this embodiment, the resilient member 62 is configured as a coiled compression spring.

The solenoid unit 70 includes a fixed iron cylinder 71 threaded to the lock rod 30 and extending along the axis (I), a second receiving chamber 72 defined by the fixed iron cylinder 71, a movable iron rod 73 movable within the second receiving chamber 72 along the axis (I), and a coil member 74 disposed around the fixed iron cylinder 71. The movable iron rod 73 includes a diameter-reduced pushing rod section 75 movable to push and move the end wall 54 of the sliding shaft 50.

Figure 9:
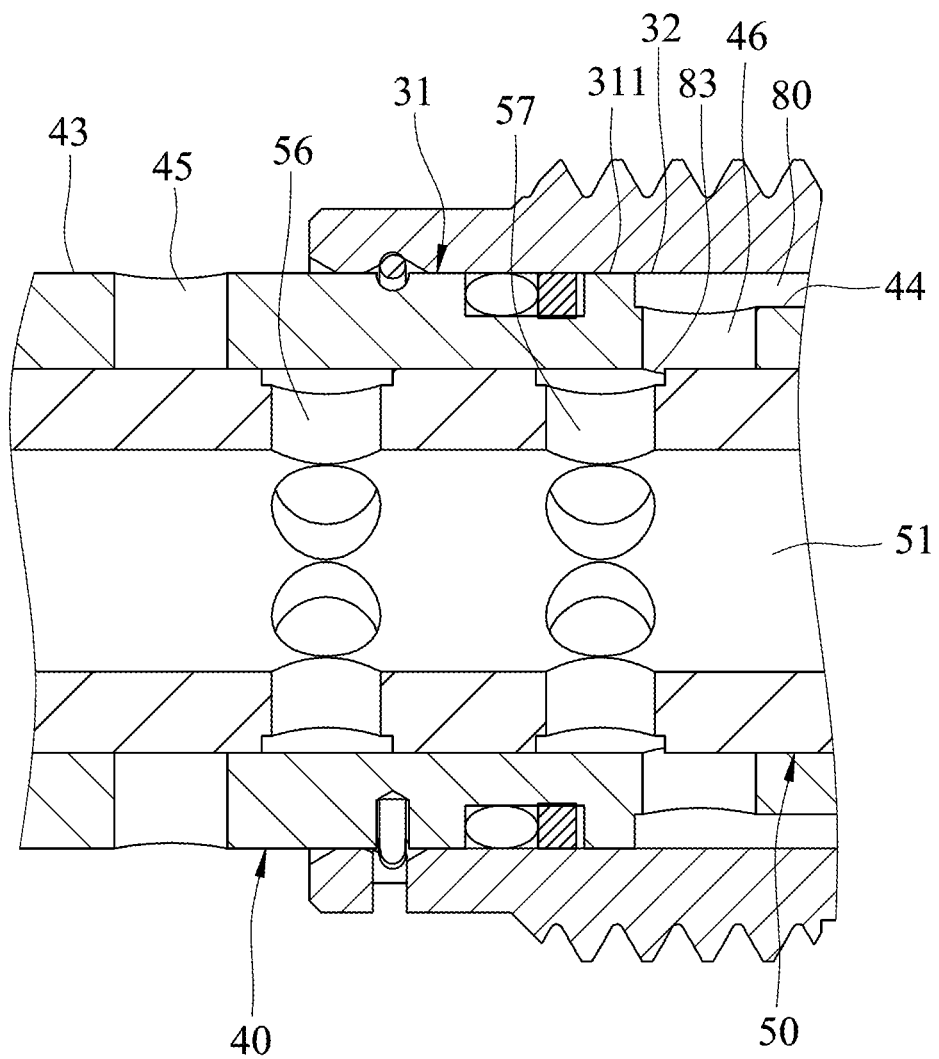
FIG. 9 is another fragmentary sectional view of the preferred embodiment, illustrating how a first opening is formed.

With particular reference to FIGS. 6, 7, and 9, during use, when the coil member 74 is not energized, the input electrical current is 0 mA, a leftward pushing force applied by the pushing rod section 75 to the end wall 54 of the sliding shaft 50 is 0 kg, a rightward pushing force applied by the resilient member 62 to the sliding shaft 50 is k (elastic modulus)×L (pre-compressed length). Hence, the sliding shaft 50 is moved rightwardly to contact the shoulder surface 314 of the lock rod 30. In this state, the second through hole 45 in the valve sleeve 40 is misaligned from the fifth through hole 56 in the sliding shaft 50, thereby preventing fluid flow from the fluid inlet 93 into the sliding shaft 50, and the third through hole 46 in the valve sleeve 40 is in fluid communication with the sixth through hole 57, so that the first opening 83 is formed, thereby allowing for flow of fluid from the workpiece into the return fluid tank along a path including the pressure-reducing port 92, the resilient member 62, the first receiving chamber 51, the sixth through hole 57, the first opening 83, the third through hole 46, the annular space 80, the first through hole 34, and the pressure relief port 94. As such, the pressure relief port 94 is maintained at a zero pressure state. In addition, the first receiving chamber 51 in the sliding shaft 50 is in fluid communication with the second receiving chamber 72 in the fixed iron cylinder 71 through the seventh through hole 58 in the sliding shaft 50, as well as the small-diameter section 312 and the threaded section 313 of the inner hole 31 in the lock rod 3, so that the first and second receiving chambers 51, 72 have the same pressure, thereby ensuring that the sliding shaft 50 and the pushing rod section 75 can be maintained at a balance state.

With particular reference to FIGS. 6, 8, 10, and 11, when an electrical current is input into the coil member 74, an electromagnetic force (F) occurs between the fixed iron cylinder 71 and the movable iron rod 73 so that the pushing rod section 75 provides a leftward pushing force to the end wall 54 of the sliding shaft 50. As soon as the leftward pushing force is greater than the rightward pushing force applied by the resilient member 62 to the sliding shaft 50, the sliding shaft 50 is pushed to move leftwardly. Hence, a second opening 84 is formed between the fifth through hole 56 in the sliding shaft 50 and the second through hole 45 in the valve sleeve 40, and the sixth through hole 57 in the sliding shaft 50 is misaligned from the third through hole 46 in the valve sleeve 40, so that the first opening 80 (see FIG. 9) is closed. As such, the fluid flows from the fluid feeding tank into the fluid inlet 93, the second opening 84, the first receiving chamber 51, and anywhere in fluid communication therewith, e.g., the pressure-reducing port 92, the seventh through hole 58, and the second receiving chamber 72, thereby allowing the sliding shaft 50 and the movable iron rod 73 to be maintained at a balance state. If the pressure of the fluid in the pressure-reducing port 92 is $P_1$, the rightward pushing force applied to the sliding shaft 50 is $[k \times L + P_1 \times \pi (D1)^2/4]$, and the leftward pushing force applied to the sliding shaft 50 is related to the pressure (P1) of the pressure-reducing port 92 and the force action area, i.e., the cross-sectional area of a hydraulic action space 82 (see FIG. 10) disposed among the end wall 54 of the sliding shaft 50, the inner sleeve surface 42, and an end of the lock rod 30. The cross-sectional area of the hydraulic action space 82 is $[P_1 \times \pi (D2)^2/4]$. When the sliding shaft 50 is balanced, the relationship between the outer diameters (D1, D2) of the large-diameter section 531 and the small-diameter section 532 of the outer shaft surface 53 can be determined using the following equation: $k \times L + P_1 \times \pi (D1)^2/4 = P_1 \times \pi (D2)^2/4 + F$. Accordingly, the electromagnetic force (F) is obtained to be $\{k \times L + P_1 \times \pi/4\ [(D1)^2 - (D2)^2]\}$. Since (K) and (L) are constant, the pressure of the fluid in the pressure-reducing port 92 can be changed by adjusting the electrical current input into the coil member 74. In addition, since the maximum valve of the electromagnetic force (F) is fixed, to obtain a greater fluid pressure in the pressure-reducing port 92, it is only necessary to increase the outer diameter (D2) of the small-diameter 532 of the sliding shaft 50, thereby resulting in a higher strength of the sliding shaft 50. In other words, a reduction in the difference between the diameters of the large-diameter section 531 and the small-diameter section 531 results in an increase in the fluid pressure in the workpiece.

Figure 12:
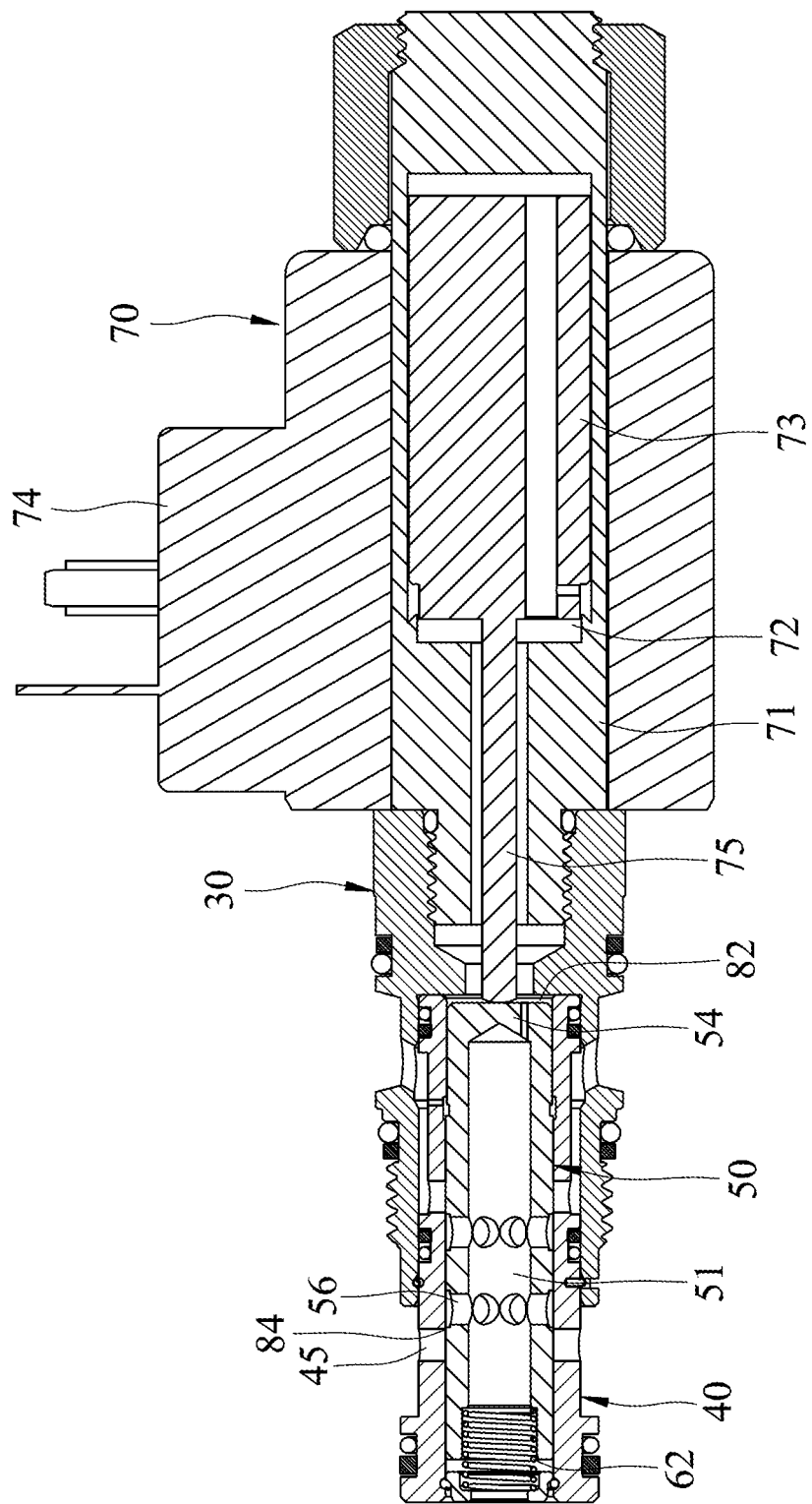
FIG. 12 is a view similar to FIG. 7 but illustrating that the constant pressure valve is in a third pressure reduction state.
Figure 13:
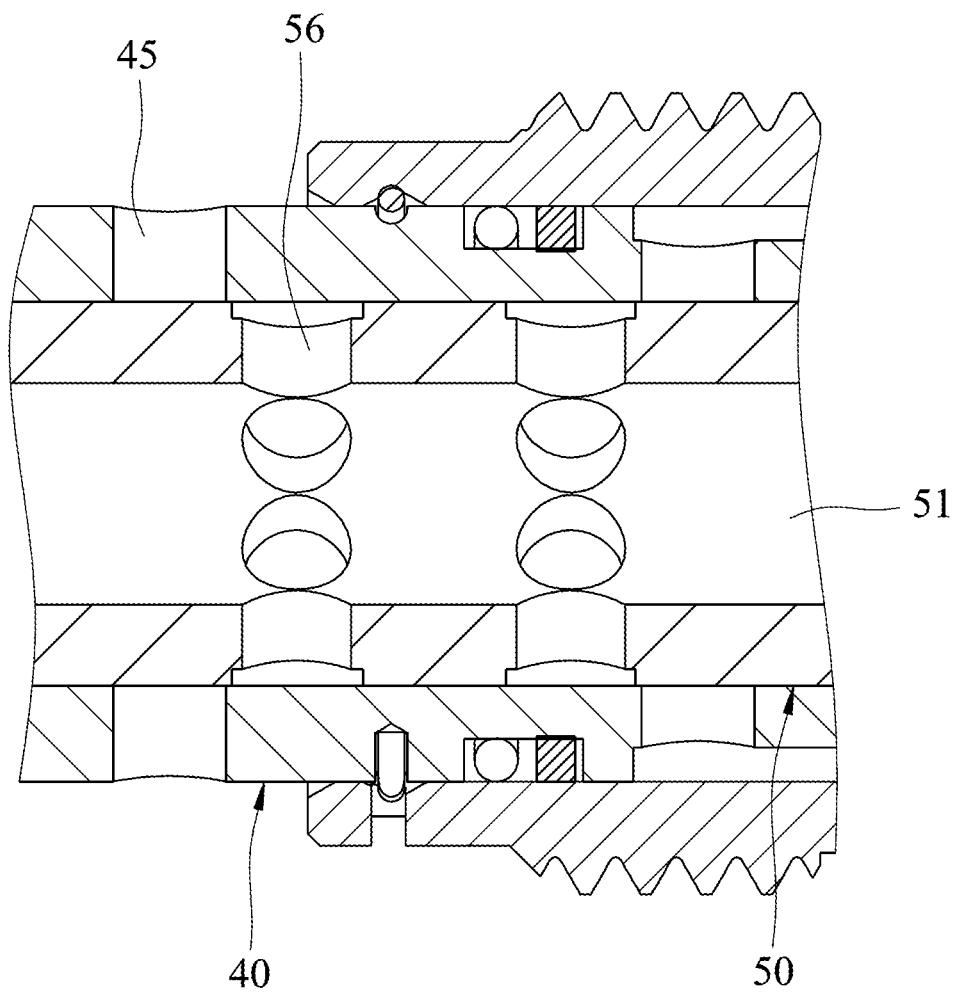
FIG. 13 is an enlarged view of a portion of FIG. 12, illustrating how a second opening is closed.

With particular reference to FIGS. 6, 12, and 13, when fluid flow from the fluid inlet 93 into the first receiving chamber 51 in the sliding shaft 50 is continued, the fluid flows into the pressure-reducing port 92, the hydraulic action space 82, the fixed iron cylinder 71, and the second receiving chamber 72. If the pressure (P1) of the press-reducing port 92 is increased to a value such that $\{k \times L + P_1 \times \pi/4 \,[(D1)^2 - (D2)^2]\}$ is greater than (F), the rightward pushing force is greater than the leftward pushing force, so that the sliding shaft 50 is moved rightwardly. During rightward movement of the sliding shaft 50, the opening degree of the second opening 84 disposed between the fifth through hole 56 in the sliding shaft 50 and the second through hole 45 in the valve sleeve 40 is reduced gradually. In accordance with Bernoulli's principle, an increase in the flow rate of the fluid in the second opening 84 results in a pressure drop. Hence, the pressure drop between the fluid inlet 83 and the pressure-reducing port 92 is increased gradually. In this state, if the fluid pressure in the fluid inlet 93 is fixed, the pressure of the pressure-reducing port 92 will be reduced to the preset pressure.

With particular reference to FIGS. 6, 12, 14, and 15, as soon as the pressure ($P_1$) in the pressure-reducing port 92 exceeds the preset pressure due to abnormal condition of the workpiece (e.g., a hydraulic cylinder is subjected to an external pushing force, or a hydraulic motor is subjected to a load), rightward movement of the sliding shaft 50 is continued until the second opening 84 is closed. Hence, since the sixth through hole 57 in the sliding shaft 50 is still misaligned from the third through hole 46 in the valve sleeve 40, fluid flow from the fluid inlet 93 into the first receiving chamber 51 in the sliding shaft 50 and from the sixth through hole 57 in the sliding shaft 50 into the third through hole 46 in the valve sleeve 40 are prevented, so that the fluid pressure in the pressure-reducing port 92 is no longer increased, and is returned to the preset pressure. If the pressure ($P_1$) in the pressure-reducing port 92 still exceeds the preset pressure, rightward movement of the sliding shaft 50 is continued until the first opening 83 is formed again to allow the fluid to flow from the pressure-reducing port 92 into the annular space 80 through the first opening 83, and finally into the return fluid tank through the first through hole 34 in the lock rod 30 and the pressure relief port 94, thereby returning the fluid pressure ($P_1$) in the pressure-reducing port 92 to the preset pressure.

Figure 10:
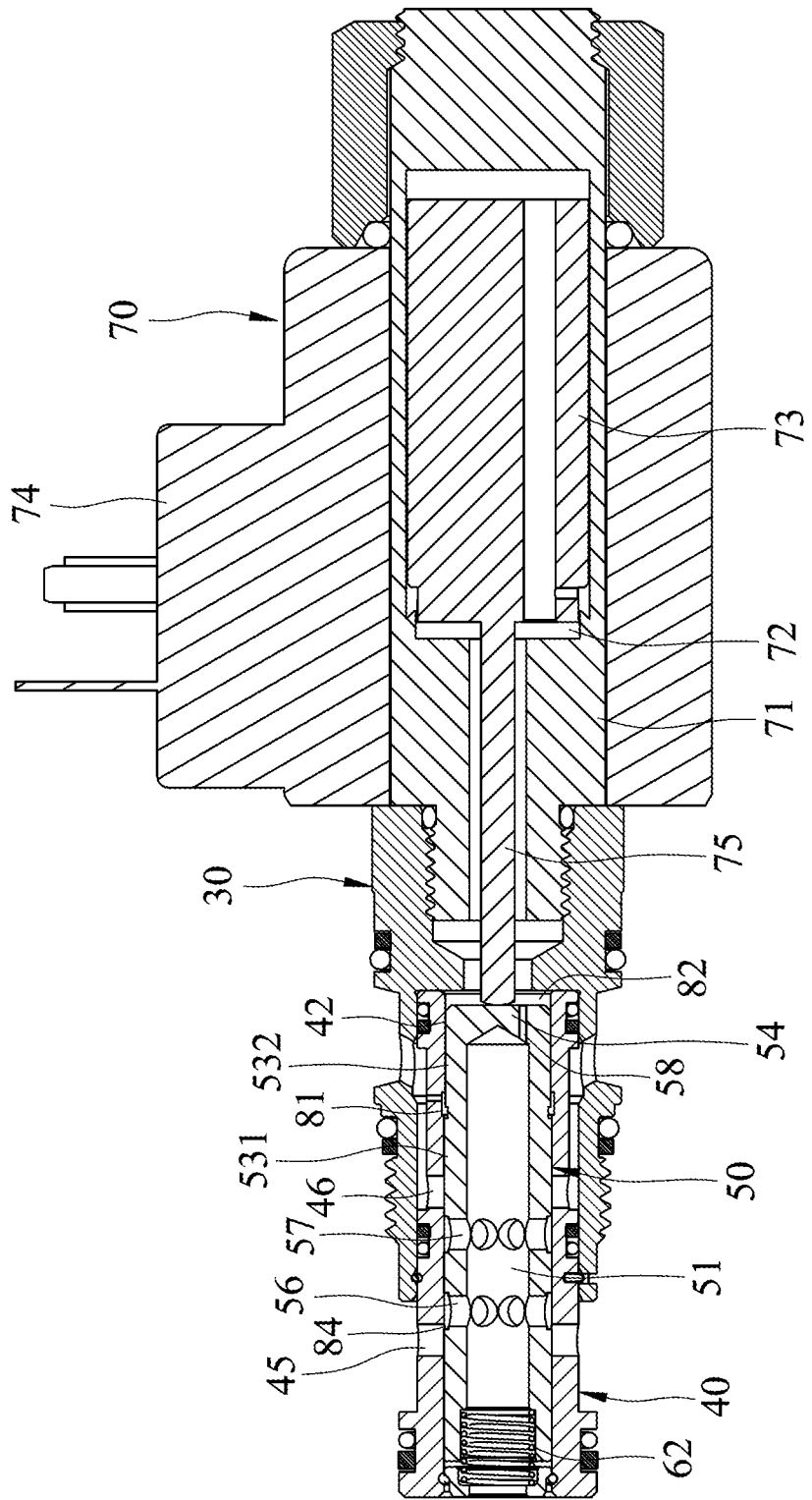
FIG. 10 is a view similar to FIG. 7 but illustrating that the constant pressure valve is in a second pressure reduction state.
Figure 11:
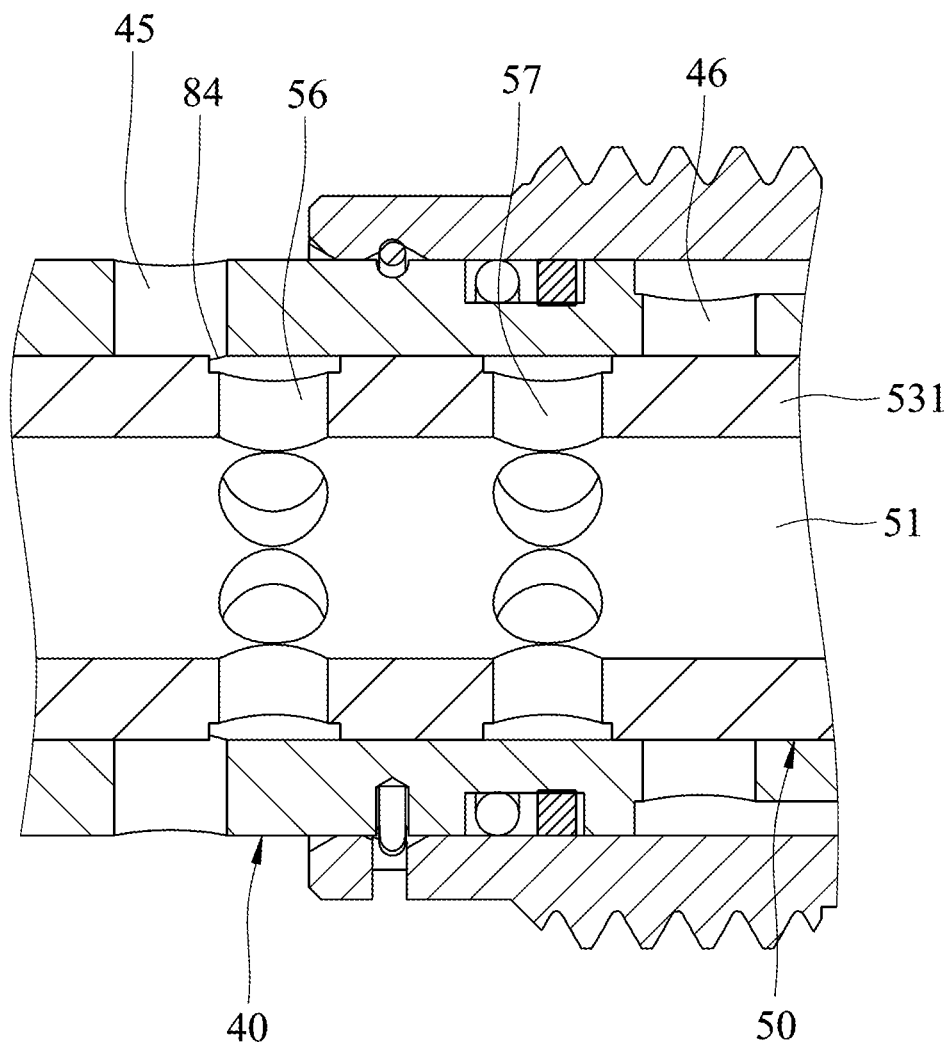
FIG. 11 is an enlarged view of a portion of FIG. 10, illustrating how a second opening is formed.
Figure 14:
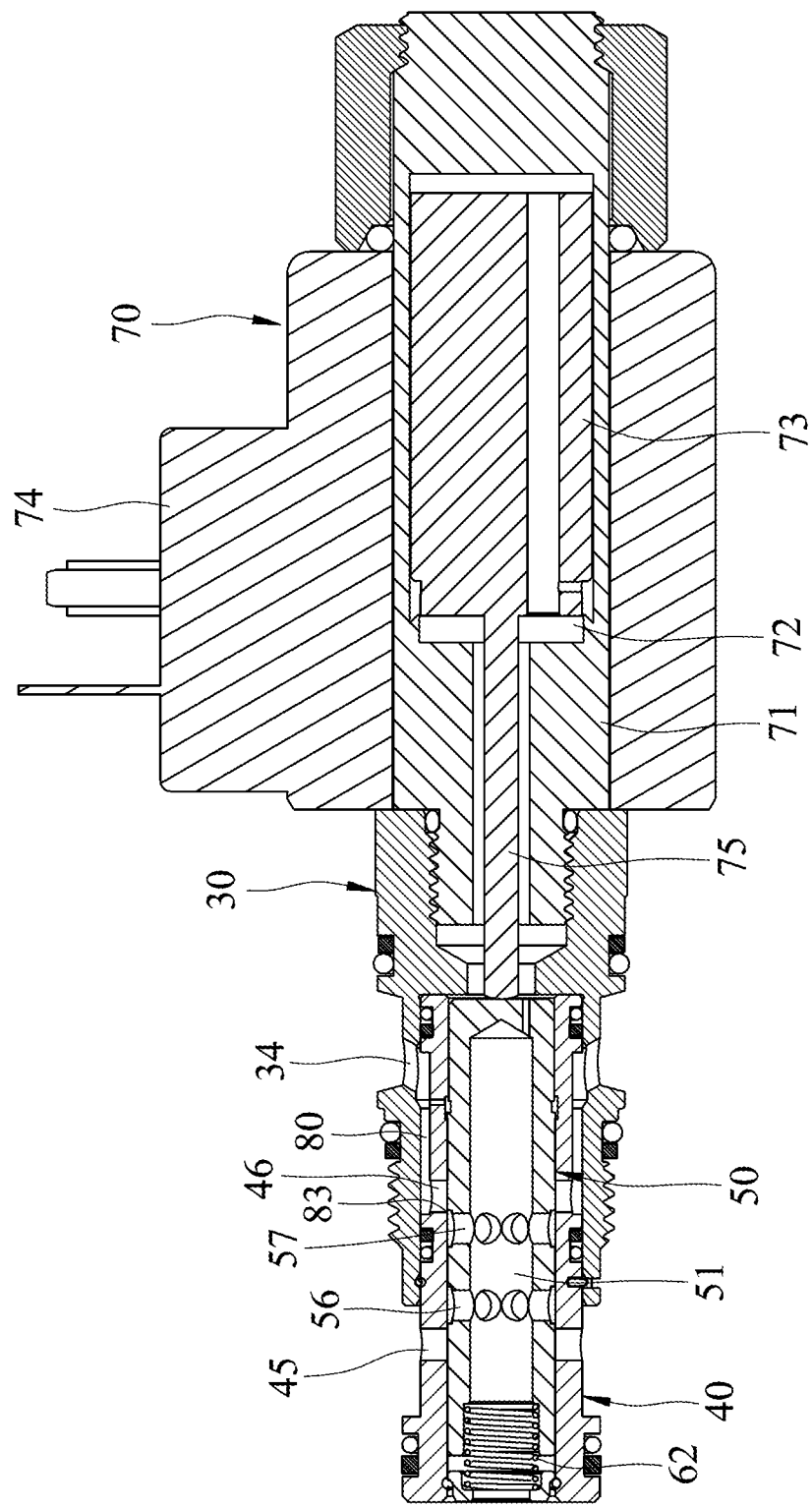
FIG. 14 is a view similar to FIG. 12 but illustrating that the constant pressure valve is in a pressure relief state.
Figure 15:
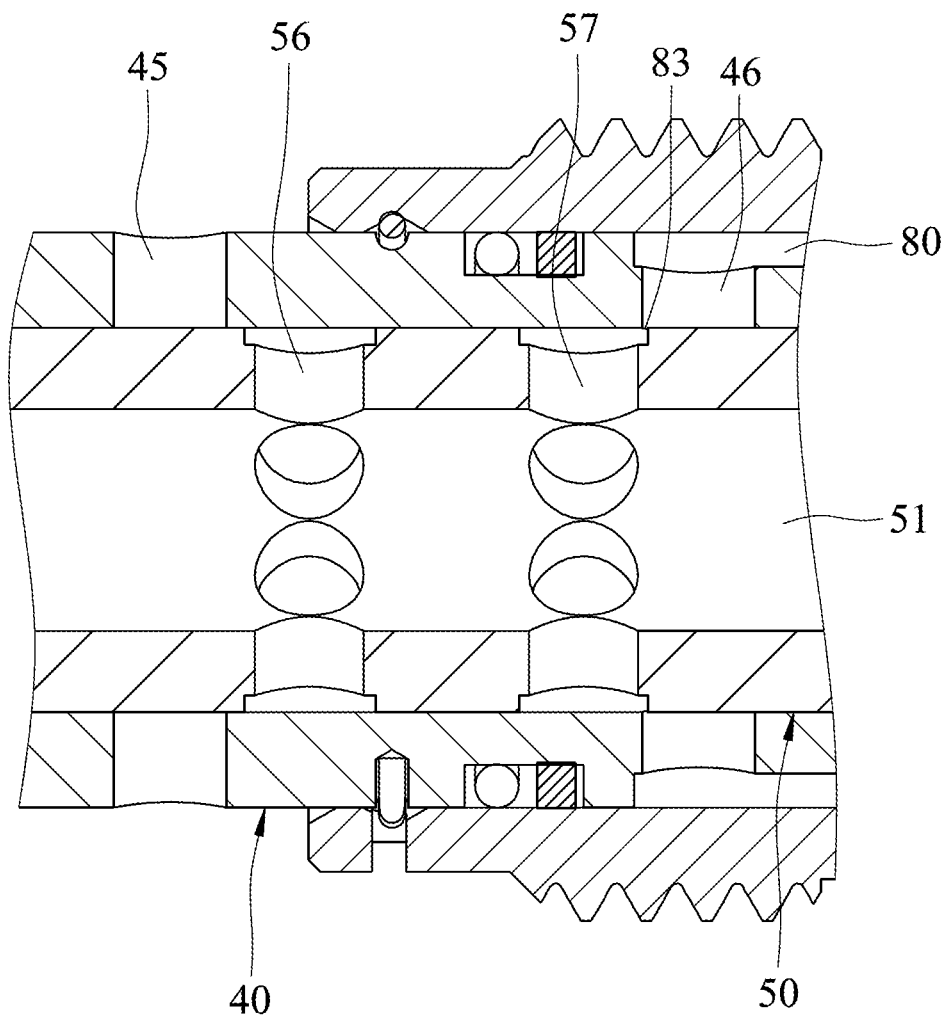
FIG. 15 is an enlarged view of a portion of FIG. 14, illustrating that the first opening is formed again.

FIGS. 7, 10, and 12 illustrate the pressure reduction function of the constant pressure valve. FIG. 14 illustrates the pressure relief function of the constant pressure valve. These two functions of the constant pressure valve enable the fluid pressure ($P_1$) in the pressure-reducing port 92 to be maintained at the preset pressure. The sliding shaft 50 can move rightwardly to reduce the fluid pressure ($P_1$) in the pressure-reducing port 92, and can move leftwardly to increase the fluid pressure ($P_1$) in the pressure-reducing port 92, until the fluid pressure ($P_1$) in the pressure-reducing port 92 is returned to the preset pressure.

With particular reference to FIGS. 6, 7, and 8, the fluid ca flows from the zero pressure space 81 into the return fluid tank along a flow path including the fourth through hole 48, the annular space 80, the first through hole 34, and the pressure relief port 94, so as to maintain a zero pressure state.

In view of the above, the constant pressure valve of this invention has an advantage. That is, the less a difference between the diameters (D1, D2) of the large-diameter section 531 and the small-diameter section 532, the more the preset pressure can be. Thus, to obtain a greater pressure, the outer diameter (D2) of the small-diameter section 532 can be increased to strengthen the sliding shaft 50, thereby prolonging the service life of the constant pressure valve.

With this invention thus explained, it is apparent that numerous modifications and variations can be made without departing from the scope and spirit of this invention. It is therefore intended that this invention be limited only as indicated by the appended claims.

I claim:

1. A constant pressure valve adapted for maintain a hydraulic device at a preset pressure, said constant pressure valve comprising:
    a lock rod including an inner hole centered at an axis, an inner rod surface defining said inner hole, an outer rod surface disposed around said axis, and a first through hole extending through said inner and outer rod surfaces;
    a valve sleeve fixed in said inner hole in said lock rod and extending along said axis, said valve sleeve including an axial hole centered at said axis, an inner sleeve surface defining said axial hole, an outer sleeve surface disposed around said axis and having a shrunk surface portion that cooperates with said inner rod surface of said lock rod to define an annular space therebetween, a second through hole extending through said inner and outer sleeve surfaces and disposed outwardly of said lock rod, and third and fourth through holes extending through said shrunk surface portion of said outer sleeve surface and said inner sleeve surface, said annular space being in fluid communication with said first through hole in said lock rod;
    a sliding shaft disposed movably within said axial hole in said valve sleeve and movable along said axis to contact said lock rod, said sliding rod including a first receiving chamber centered at said axis, an inner shaft surface defining said first receiving chamber, an outer shaft surface disposed around said axis, a closed end, an open end opposite to said closed end, an end wall disposed at said closed end, fifth and sixth through holes extending through said inner and outer shaft surfaces and disposed between said second and third through hole, and a seventh through hole extending through said end wall and in fluid communication with said first receiving chamber and said inner hole in said lock rod, said outer shaft surface having a large-diameter section distal from said end wall, and a small-diameter section proximate to said end wall, a portion of said outer shaft surface disposed between said large-diameter section and said small-diameter section cooperating with said inner sleeve surface to define a zero pressure space, said end wall cooperating with said inner sleeve surface and an end of said lock rod to define a hydraulic action space thereamong;
    a biasing unit disposed between said valve sleeve and said sliding shaft for biasing said sliding rod toward said lock rod; and
    a solenoid unit including a fixed iron cylinder mounted to said lock rod and extending along said axis, a second receiving chamber defined by said fixed iron cylinder, a movable iron rod movable within said second receiving chamber along said axis, and a coil member disposed around said fixed iron cylinder, said movable iron rod including a pushing rod section movable to push and move said sliding rod, said second receiving chamber being in fluid communication with said first receiving chamber in said sliding rod.

2. The constant pressure valve as claimed in claim 1, wherein said inner sleeve surface of said valve sleeve further has a first concaved surface portion defining a first annular groove, and said outer shaft surface of said sliding shaft further has a second concaved surface portion defining a second annular groove, said first and second concaved surface portions cooperating to define said zero pressure space.

3. The constant pressure valve as claimed in claim 2, wherein said inner hole in said lock rod has a thick section, a thin section, and a threaded section, said thin section being disposed between said thick section and said threaded section, said lock rod further including a shoulder surface disposed between said thick and thin sections and defining an end of said thick section, said valve sleeve having an end abutting against said shoulder surface, said sliding shaft being movable into contact with said shoulder surface, said threaded section being threaded within said fixed iron cylinder.

4. The constant pressure valve as claimed in claim 3, wherein said biasing unit includes a fixed seat fixed in said axial hole in said valve sleeve, and a resilient member disposed between said fixed seat and said sliding shaft for biasing said sliding shaft away from said fixed seat.

5. The constant pressure valve as claimed in claim 4, wherein said resilient member is configured as a coiled compression spring.

* * * * *